Patented Aug. 3, 1926.

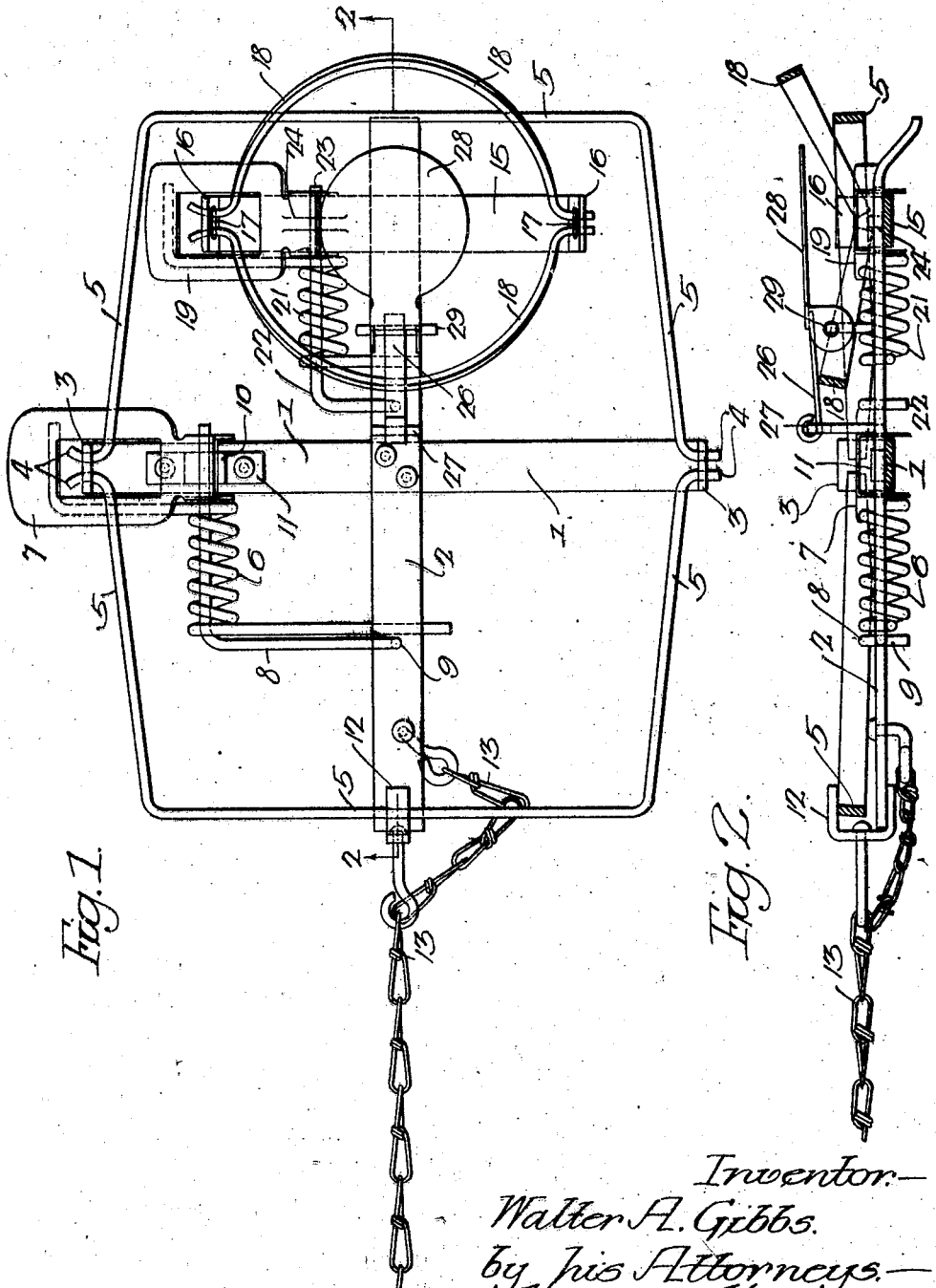

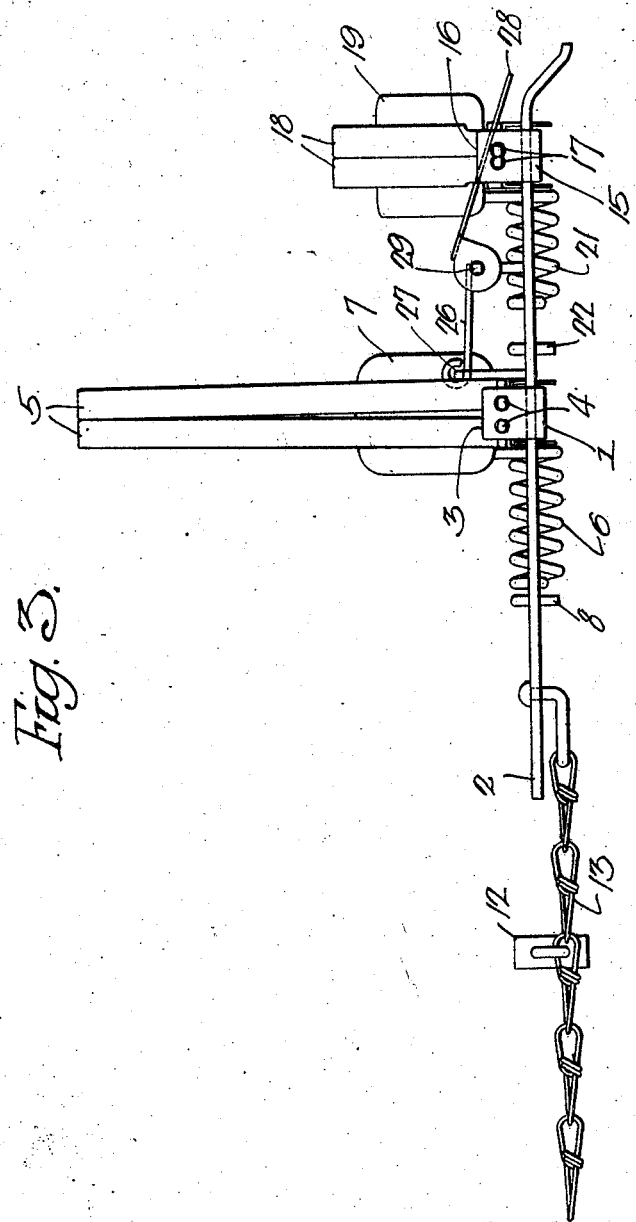

1,594,939

UNITED STATES PATENT OFFICE.

WALTER A. GIBBS, OF HOLLY OAK, DELAWARE.

ANIMAL TRAP.

Application filed March 24, 1924. Serial No. 701,551.

This invention relates to that type of trap employing a plurality of independent animal-gripping devices, and the principal object of the invention is to provide a trap of this type in which the said gripping devices are offset from each other in such manner as to make the distance between the gripping points of the respective devices a considerable one.

Compound traps of this general type have been produced, but so far as I am aware they have always been made with the two sets of jaws arranged concentrically. In this latter arrangement, there are certain inherent disadvantages adversely affecting the efficiency of the trap, and to avoid these disadvantages is the principal object of the present invention.

The devices by which I accomplish this end are illustrated in the attached drawings, in which:—

Figure 1 is a plan view of a trap made in accordance with my invention and having two sets of jaws which are shown in the open or set position;

Fig. 2 is a section on line 2—2, Fig. 1, and

Fig. 3 is a side elevation of the trap with the jaws closed.

With reference to the drawings, the trap comprises in the present instance a base consisting in part of crossed pieces 1 and 2 secured together at their intersection. The extremities of the base piece 1 are turned up, as indicated at 3, and are provided with openings for the trunnioned ends 4 of one set of jaws 5, 5. A spring 6 is provided for actuating the jaws 5, 5, this actuation taking place through a lever 7 of well known form, which lever is pivotally mounted upon the member 1, and is adapted not only to bring the jaws together but to lock them in the closed or animal-gripping position. The spring 6 is mounted in the present instance upon a rod 8, one end 9 of which extends downwardly through an aperture in the base piece 2, while the other end passes through a loop 10 on the base piece 1, said loop in the present instance being formed by a piece 11 riveted to the said base. One end of the spring 6 lies under the base piece 2, while the other end of the spring occupies a position beneath the lever 7 and creates a pressure on the latter tending to elevate it and thereby to close the jaws 5, 5, which in closing move through angles of 90° from open position shown in Fig. 1 to closed position shown in Fig. 3.

It will be noted that that end of the support rod 8 which projects through the loop 10 constitutes the pivot mounting for the lever 7. This arrangement of spring and lever lends itself to ready detachment of these parts from the trap, this being accomplished by freeing the end 9 of the rod 8 from the aperture which it normally occupies, and thereafter withdrawing the other end of the rod from its bearings.

The jaws 5, 5, are maintained in the open position, as shown in Fig. 1, by means in the present instance of a U-shaped retaining piece 12 which, as clearly illustrated, is attached to the chain 13 by means of which the trap is secured in any desired location. This retaining piece 12, as best shown in Fig. 2, is adapted to fit under one end of the base piece 2 and over the top of one of the jaws 5 whereby the latter are held in the open position against the tension of the spring 6 applied through the lever 7. Between the point where the member 12 attaches to the chain 13 and the point where the chain attaches to the base piece 2, a sufficient amount of slack is provided, when the retaining member 12 is in the jaw-retaining position as illustrated in Figs. 1 and 2, to provide for the withdrawal of the member 12 from engagement with the jaw when the chain is put under tension.

In addition to the jaws 5, 5, a second set of jaws is provided which, in the present instance, are mounted upon a cross member 15 secured to the base member 2, and it will be noted that in the present instance the two sets of jaws close into vertical planes, and that these closing planes, when parallel as in the illustrated embodiment, are spaced a substantial distance apart. The ends 16 of this cross piece 15 are turned upwardly and are provided with apertures in the same manner as the cross piece 1, the apertures 17, 17, constituting bearings for the trunnioned ends of jaws 18, 18. These jaws are actuated through a lever 19, similar to the lever 7, by a spring 21, said spring being supported in the present instance upon a rod 22, one end of which projects downwardly through an aperture in the base piece 2, while the other end 23 projects through a loop 24 pressed up, in the present instance, from the cross piece 15. Similar to the rod 8, the end 23 of the rod 22 constitutes the pivot support for the lever 19. One end of the spring 21 extends underneath the base piece 2, while the other end lies beneath the lever 19 and exerts a pressure on the latter tending to elevate it and thereby to close the jaws 18, 18. This set of jaws 18, 18, which I will term the primary jaws, is held in the open position by means of a latch 26 pivotally secured at 27 to the base and whose free end, after passing over one of the jaws 18, as clearly illustrated in Fig. 2, is adapted to extend beneath the edge of a treadle 28, which latter is pivoted at 29 on the base. The latch 29 tends to maintain the treadle 28 in a more or less elevated position, and the arrangement is such that when the treadle 28 is depressed, the latch will be released and will permit the spring 21 through the lever 19 to actuate the jaws 18, 18.

It will be noted by reference to Fig. 3 that the jaws 5, 5, are sufficiently large to pass over the jaws 18, 18, when the latter are in the closed position. When, however, the respective sets of jaws are opened, one of the jaws 5 will underlie one of the jaws 18, as clearly shown in Fig. 1. Actuation of the respective sets of these jaws is controlled by separate animal-releasable means, that controlling the jaws 5, 5, being the member 12 with the chain 13, and the latch 26 and treadle 28 controlling the actuation of the jaws 18, 18.

It will be obvious, however, that various types of controls and release means may be employed without departing from the essential features of the invention. It will also be understood that the invention in its broadest sense is not confined to any particular arrangement or relation of the sets of jaws 5, 5, and 18, 18, other than that these jaws are offset one from the other.

I claim:—

1. An animal trap comprising independent and overlapping sets of jaws, with one of said sets offset transversely from the axis of the other set.

2. In an animal trap, the combination with animal-gripping means including at least one pivotally mounted member, of other gripping means embraced by said member and offset transversely from the pivotal axis thereof.

3. In an animal trap, the combination with animal-gripping means including at least one pivotally mounted jaw, of other gripping means including at least one pivotally mounted jaw smaller in size than the first-named jaw and embraced thereby at least in part, and offset transversely from the pivotal axis of said first-named jaw.

4. An animal trap comprising two differently sized pairs of pivotally mounted jaws, the smaller of said pairs being offset transversely from the axis of the larger pair and being embraced by said larger pair when the latter are in the open position.

5. An animal trap comprising two differently sized pairs of pivotally mounted jaws, the smaller of said pairs being offset transversely from the axis of the larger pair and being embraced by said larger pair when the latter are in the open position, and independent actuating means for said pairs of jaws.

6. An animal trap comprising two differently sized pairs of pivotally mounted jaws, the smaller of said pairs being offset transversely from the axis of the larger pair and being embraced by said larger pair when the latter are in the open position, spring means for independently actuating said jaws, and independent animal-releasable means for locking the jaws in the open position.

7. An animal trap comprising two differently sized pairs of jaws pivotally mounted on parallel axes, the smaller of said pairs being offset transversely from the axis of the larger pair and being embraced by said larger pair at least in part when the latter are in the open position.

WALTER A. GIBBS.